United States Patent
Kleinsasser et al.

(10) Patent No.: US 11,213,009 B2
(45) Date of Patent: Jan. 4, 2022

(54) PIG FEEDER FOR FEEDING WEANLING TO FINISHER PIGS

(71) Applicant: Crystal Spring Colony Farms Ltd., Ste. Agathe (CA)

(72) Inventors: Jonathan Kleinsasser, Ste. Agathe (CA); Tom McAdams, Ste. Agathe (CA)

(73) Assignee: Crystal Spring Colony Farms Ltd., Ste Agathe (CA)

(*) Notice: Subject to any disclaimer, the term of this patent is extended or adjusted under 35 U.S.C. 154(b) by 107 days.

(21) Appl. No.: 16/486,680

(22) PCT Filed: Jun. 1, 2018

(86) PCT No.: PCT/CA2018/050654
§ 371 (c)(1),
(2) Date: Aug. 16, 2019

(87) PCT Pub. No.: WO2018/223222
PCT Pub. Date: Dec. 13, 2018

(65) Prior Publication Data
US 2020/0084997 A1    Mar. 19, 2020

Related U.S. Application Data

(60) Provisional application No. 62/516,467, filed on Jun. 7, 2017.

(51) Int. Cl.
*A01K 5/02*    (2006.01)
*A01K 5/01*    (2006.01)

(52) U.S. Cl.
CPC .............. *A01K 5/0225* (2013.01); *A01K 5/01* (2013.01); *A01K 5/0216* (2013.01)

(58) Field of Classification Search
CPC .. A01K 5/0225; A01K 5/0216; A01K 5/0233; A01K 5/01
See application file for complete search history.

(56) References Cited

U.S. PATENT DOCUMENTS

| | | | | |
|---|---|---|---|---|
| 961,779 A | * | 6/1910 | Kellum | A01K 5/0241 119/54 |
| 1,719,245 A | * | 7/1929 | Smidley | A01K 5/025 119/53.5 |
| 2,650,566 A | * | 9/1953 | Rook | A01K 39/012 119/53.5 |

(Continued)

FOREIGN PATENT DOCUMENTS

WO    WO-2017087250 A1 *  5/2017  ............... A01K 7/02

*Primary Examiner* — Ebony E Evans
(74) *Attorney, Agent, or Firm* — Adrian D. Battison; Ade & Company Inc.; Ryan W. Dupuis

(57) ABSTRACT

A feeder for pigs as they grow continually from weanling size to finisher pig size includes a trough and a shelf with a water pipe located underneath the shelf with a plurality of water dispensing nipples operable by the pigs to dispense water downwardly into the trough for mixing with feed in the trough. The shelf is fixed in height at a common height for use by the pigs both as weanling size and as they grow to finisher size so that it is not adjustable to accommodate growth. This is obtained by selecting the dimensions of the height of the shelf relative to the water nipples and the side walls and the shape of the shelf to allow the required access.

28 Claims, 3 Drawing Sheets

(56) References Cited

U.S. PATENT DOCUMENTS

| | | | | |
|---|---|---|---|---|
| 4,660,508 | A * | 4/1987 | Kleinsasser | A01K 5/0225 119/51.5 |
| 5,255,632 | A * | 10/1993 | Thomas | A01K 5/0225 119/51.5 |
| 5,603,285 | A * | 2/1997 | Kleinsasser | A01K 5/0225 119/53 |
| 5,967,083 | A * | 10/1999 | Kleinsasser | A01K 5/0225 119/52.4 |
| 7,891,317 | B2 * | 2/2011 | Bodenstab | A01K 5/0225 119/53 |
| 7,975,648 | B2 * | 7/2011 | Kleinsasser | A01K 5/0225 119/53 |
| 2010/0229799 | A1 * | 9/2010 | Brehmer | A01K 5/0216 119/53.5 |
| 2017/0000083 | A1 * | 1/2017 | McAdams | F16K 31/1266 |
| 2019/0239473 | A1 * | 8/2019 | Brehmer | A01K 5/025 |

* cited by examiner

PIG FEEDER FOR FEEDING WEANLING TO FINISHER PIGS

This invention relates to a feeder for pigs which is designed for feeding the pigs as they grow from weaning to finishing without adjustment for the changing size of the animal.

BACKGROUND OF THE INVENTION

In U.S. Pat. No. 4,660,508 (Kleinsasser) issued Apr. 28, 1987 is disclosed a feeder which provides a shelf above the trough with the hopper discharging onto the shelf in a manner so that the feed remains on the shelf but can be moved from the shelf to the trough by the pig as required. Feeders of this type have achieved significant commercial success. Adjustment of the height of the shelf is necessary for the purpose of accommodating different types of feed and different feed rates and this is obtained by a hand crank screw which operates with a threaded nut to raise and lower a strap carrying the shelf. The screw is used in adjustment of this device because the deposit of the feed onto the self requires an accurate adjustment of the distance between the shelf and the bottom edge of the hopper so that cruder systems with a less fine adjustment have been rejected.

In U.S. Pat. No. 5,603,285 issued Feb. 18, 1997 and U.S. Pat. No. 5,967,083 issued Oct. 19, 1999 both by Kleinsasser of the present assignees there is shown a similar arrangement which includes a hopper above a shelf onto which feed can fall to be taken by the pig or dropped into a trough below the shelf. The height of the shelf is adjustable to change the width of the opening through which the feed passes to control feed rate. The shelf is carried on straps which extend along the end walls of the hopper and are movable by an adjustment linkage which allows the shelf to be adjusted in height for use with both weanling pigs and finisher pigs up to market weight.

The disclosures of the above patents are incorporated herein by reference or may be reviewed for further details not set out herein.

It has been well known for more than 20 years that it is desirable to provide a single feeder construction of this type which can be used both for the weanlings and the finisher pigs so that the weanlings can be moved to a pen and maintained in that pen until ready for market. As set forth in the above patents it has been necessary during those years to provide a feeder which is adjustable to allow a change in dimension during the growth process or the feeder will be unsuitable or ineffective at one or other of the extremes of the growth range. It will be appreciated that not only is it necessary that the animals can take the feed but also that there is no impediment or inefficiency of feed take up since the whole objective is to maximize feed take up at all stages of growth.

SUMMARY OF THE INVENTION

According to a first aspect of the invention there is provided a method for feeding pigs as they grow continually from weaning size to finisher pig size comprising:

providing a feeder unit which is accessed by the pigs both at weanling and finisher size;

the feeder unit having an elongate trough having a base and a sidewall for receiving and containing feed and arranged such that the head of the pig can reach over a top edge of the sidewall to the base for eating the feed;

the feeder unit having an elongate shelf extending substantially along a full length of the trough and providing a substantially horizontal surface for receiving feed, said horizontal surface of said shelf being arranged rearwardly of said top edge and separate from said trough such that any feed falling therefrom along the full length thereof can fall directly vertically downwardly into the trough and so as to allow access by the head of the pig to said shelf for direct feeding therefrom, and between said shelf and said top edge to said base;

the feeder unit having a hopper for directly and continuously depositing feed onto said shelf;

said hopper including an elongate lowermost edge, the feeder unit having said lowermost edge and said shelf mounted and arranged such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents the feed from falling over the front edge of the shelf and thus automatically controls deposit of further feed onto said shelf;

the feeder unit having a water pipe located underneath the shelf along the shelf with a plurality of water dispensing nipples mounted on the pipe at spaced positions along the pipe and extending from the pipe downwardly toward the base of the trough, the nipples being operable by the pigs to dispense water downwardly into the trough for mixing with feed in the trough;

the shelf being substantially fixed in height at a common height without adjustment for growth for use by the pigs both as weanling size and as they grow to finisher size;

arranging and fixing the shelf at a substantially fixed height relative to the upper front edge of the side wall such that the weanlings reach the feed on the shelf;

and arranging and fixing the shelf at the same substantially fixed height relative to the upper front edge of the side wall and the nipples such that the finisher pigs reach over the top edge of the side wall under the front edge of the shelf and operate the nipples.

It will be appreciated that the above invention can be expressed either as a method as defined above or as a feeder unit having the same features and characteristics.

Typically the shelf is adjustable in height over a distance sufficient only to adjust the space between the bottom edge of the hopper and the horizontal surface of the shelf to control supply of material onto the shelf. That is there is no adjustment for the size of the pig but only for the characteristic of the feed and its flow onto the shelf. Thus the shelf is typically adjustable in height by a distance less than 1.0 inch and not the much larger value necessary to allow the weanlings to feed.

In order to achieve this situation where the finishers can reach under the shelf to the water, the shelf has an edge portion at the front edge extending downwardly from the horizontal surface to a distance which is preferably less than 2.0 inches and more preferable less than 1.5 inches.

In order to achieve this situation where the finishers can reach under the shelf to the water, the shelf preferably has an edge portion defined by a curl or hem on the shelf edge and is reinforced by a member on the shelf underneath.

In order to achieve this situation where the finishers can reach under the shelf to the water, the shelf preferably has a distance from the horizontal surface to the base of less than 8.0 inches and preferable less than 7.0 inches.

In order to achieve this situation where the finishers can reach under the shelf to the water, the shelf has preferably an edge portion defined by a curl or hem on the shelf edge wherein no part of the curled or hemmed edge portion extends downwardly to a distance greater than 1.5 inches and preferably 1.0 inches from the horizontal surface.

In order to achieve this situation where the finishers can reach under the shelf to the water, the shelf is preferably reinforced by a member extending longitudinally of the shelf at a positon spaced rearwardly from the front edge such that the head of the finisher pig can pass underneath the front edge and underneath the member to the nipple adjacent the base.

In order to achieve this situation where the finishers can reach under the shelf to the water, a bottom end of each nipple is preferably located a distance from a flat horizontal portion of the base of less than 2.0 inches and preferably less than 1.5 inches and preferably of the order of 1.0 inch.

In order to achieve this situation where the finishers can reach under the shelf to the water, the front edge of the shelf has preferably a closest distance from a top edge of the side wall which is less than 7.0 inches.

Preferably the trough and the shelf are both a double sided such that the pigs can access both from each side with the shelf located midway across the trough.

In order to achieve this situation where the finishers can reach under the shelf to the water, the shelf is preferably reinforced by a member extending longitudinally of the shelf at a positon spaced rearwardly from the front edge such that the head of the finisher pig can pass underneath the front edge and underneath the member to the nipple adjacent the base and wherein the member is along a center line of the shelf.

In order to achieve this situation where the finishers can reach under the shelf to the water, the side wall of the trough is preferably no greater than 5 inches in height.

The weanlings are defined as pigs which weigh less than 30 and typically around 20 pounds and finisher pigs greater than 200 pounds and up to 300 pounds.

In accordance with another important feature of the invention, the shelf is formed of sheet material which has a side edge portion of the sheet material forming the shelf defined by a curled portion of the sheet material which is curved upwardly and inwardly such that the edge of the material sits on an upper surface of the material, the curled portion being located on top of the upper surface such that a bottom surface of the shelf at the edge is substantially flat with no depending portion. The curled portion is typically generally cylindrical so as to be curled around an axis raised from the upper surface of the shelf sheet metal so that the whole of the curl is above the upper surface. The edge is tightly located at the upper surface so as to seal as far as possible the curled portion to make a closed annular lip.

Preferably the shelf is reinforced by a flange extending longitudinally of the shelf at a positon spaced rearwardly from the side edge and typically lying along a center line of the shelf. The flange preferably extends upwardly but can be depending.

According to another aspect of the invention there is provided a feeder unit for feeding pigs as they grow continually from weanling size to finisher pig size comprising:

an elongate trough having a base and a sidewall for receiving and containing feed and arranged such that the head of the pig can reach over a top edge of the sidewall to the base for eating the feed;

an elongate shelf extending substantially along a full length of the trough and providing a substantially horizontal surface for receiving feed, said horizontal surface of said shelf being arranged rearwardly of said top edge and separate from said trough such that any feed falling therefrom along the full length thereof can fall directly vertically downwardly into the trough and so as to allow access by the head of the pig to said shelf for direct feeding therefrom, and between said shelf and said top edge to said base;

a hopper for directly and continuously depositing feed onto said shelf;

said hopper including an elongate lowermost edge, the feeder unit having said lowermost edge and said shelf mounted and arranged such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents the feed from falling over the front edge of the shelf and thus automatically controls deposit of further feed onto said shelf;

the feeder unit having a water pipe located underneath the shelf along the shelf with a plurality of water dispensing nipples mounted on the pipe at spaced positions along the pipe and extending from the pipe downwardly toward the base of the trough, the nipples being operable by the pigs to dispense water downwardly into the trough for mixing with feed in the trough;

wherein the shelf is formed of sheet material which has a side edge portion of the sheet material forming the shelf defined by a curled portion of the sheet material which is curved upwardly and inwardly such that the edge of the material sits on an upper surface of the material, the curled portion being located on top of the upper surface such that a bottom surface of the shelf at the edge is substantially flat with no depending portion.

Typically the shelf is double sided with two symmetrical side edge portions.

Preferably the shelf is reinforced by a member extending longitudinally of the shelf at a positon spaced rearwardly from the side edge.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
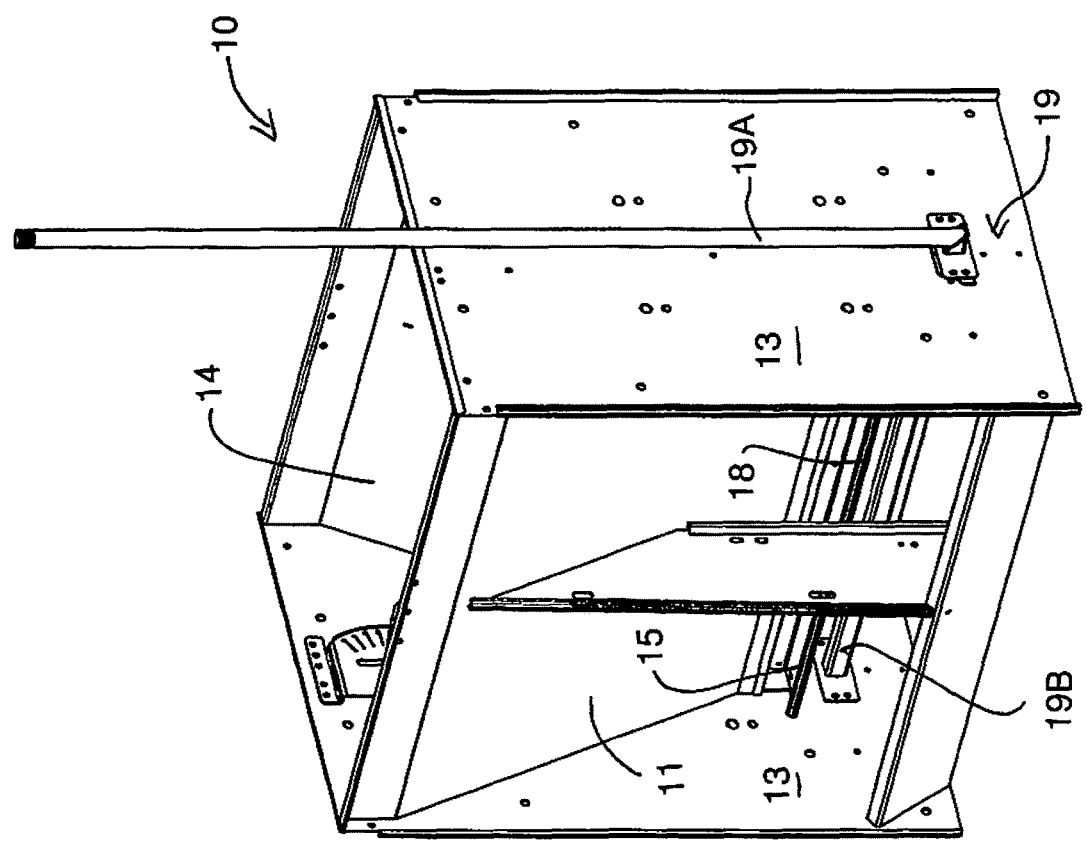
FIG. 1 is an isometric view of a feeder according to the present invention.

The feeder shown herein is similar in construction to that shown in the above patents of the present inventor, to which reference may be made for further detail.

A feeder is generally indicated at 10 and includes a hopper 11 and a trough 12. The trough is connect to the hopper by end walls 13 so as to form an integral structure with generally open top 14 through which feed can be inserted for containing in the hopper and for discharge into the trough 12 for feeding by one or more pigs. In the embodiment shown there is provided a shelf 15 with a generally horizontal surface 16 and an upturned curled edge 17.

A water supply 19 into the trough can be provided which includes an upstanding feeder pipe 19A, a pipe 19B along the trough and a plurality of downwardly extending nipples 19C with a pin or lever 19D under operation by the pig as is known in the above patents. A bottom end of the pin or actuator is shown at 19E.

The shape and arrangement of the hopper and trough can be varied and can provide either a two sided structure as shown or a single sided structure.

The height of the shelf relative to the end wall of the hopper is adjusted by raising straps 20 where each strap is arranged at a respective end of the shelf and lies along the end wall 13 parallel to the end wall. The strap is raised and lowered by a lever 21 which can be connected to a support 23.

The elongate trough 12 has a flat horizontal base 12A and a sidewall 12B for receiving and containing feed and arranged such that the head of the pig can reach over a top edge 12C of the sidewall to the base 12A for eating the feed.

The elongate shelf 15 extends substantially along a full length of the trough and provides a substantially horizontal surface 16 for receiving feed. The horizontal surface of the shelf is arranged rearwardly of the top edge 12C and separate from the trough such that any feed falling therefrom along the full length thereof can fall directly vertically downwardly into the trough and so as to allow access by the head of the pig to the shelf for direct feeding therefrom, and between the shelf and the top edge to the base. The hopper 11 has an elongate lowermost edge 11A mounted and arranged such that the lowermost edge extends substantially wholly along, adjacent to and spaced from said horizontal surface by a vertical distance and spaced from a front edge 17 of the shelf by a horizontal distance such that the angle of repose of the feed from the lowermost edge to said shelf prevents the feed from falling over the front edge of the shelf and thus automatically controls deposit of further feed onto the shelf.

The water pipe 19B is located underneath the shelf along the shelf with a plurality of water dispensing nipples 19C mounted on the pipe at spaced positions along the pipe and extending from the pipe downwardly toward the base of the trough, the nipples being operable by the pigs to dispense water downwardly into the trough for mixing with any feed in the trough.

The shelf is substantially fixed in height at a common height for use by the pigs both as weanlings and as they grow to finisher pigs. The shelf is adjustable as described hereinafter only in relation to the edge 11A to control feed flow depending on the flow characteristics of the feed and not to compensate for or to accommodate for changes in size of the animal caused by growth.

The shelf 15 is fixed at the substantially fixed height relative to the upper front edge 12C of the side wall such that the weanlings can reach the feed on the shelf.

The shelf 15 is fixed at the same substantially fixed height relative to the upper front edge of the side wall and the nipples such that the finisher pigs reach over the top edge 12C of the side wall under the front edge 17 at the bottom 18A of the lip 18 of the shelf and operate the nipples.

The shelf 15 is adjustable in height over a distance sufficient only to adjust the space between the bottom edge of the hopper and the horizontal surface of the shelf to control supply of material onto the shelf and not to accommodate for growth. That is the shelf is adjustable in height by a distance less than 1.0 inch.

The shelf has an edge portion 18 at the front edge 17 defined by a hem or curled edge stiffening member which extends upwardly. However if a depending edge flange is used this can extend downwardly from the horizontal surface 16 to bottom edge 18A a distance which less than 2.0 inches and preferable less than 1.5 inches.

The shelf has an edge portion defined by a curl on the sheet metal forming the shelf edge and is reinforced by a flange 18C on the shelf at the center of the shelf which can be underneath extending downwardly or can extend upwardly.

Figure 3:
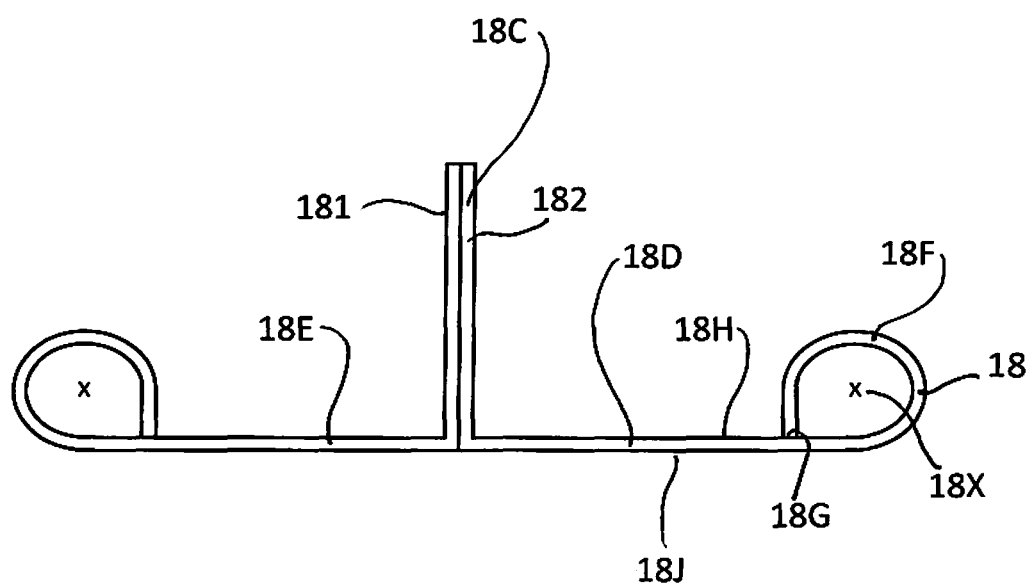
FIG. 3 is a cross sectional view on an enlarged scale of the embodiment of FIG. 1 showing the arrangement of the shelf.

Thus the shelf, as shown in FIG. 3, is formed of two portions of sheet material 18D, 18E each of which has a side edge portion 18 of the sheet material forming the shelf defined by a curled portion 18F of the sheet material which is curved upwardly and inwardly such that the edge 18G of the material sits on an upper surface 18H of the material. The curled portion is located wholly on top of the upper surface 18H such that a bottom surface 18J of the shelf at the edge is substantially flat with no depending portion. The curled portion 18F is generally cylindrical so as to be curled around an axis 18X raised from the upper surface 18H of the shelf sheet metal so that the whole of the curl is above the upper surface. The edge 18G is tightly located at the upper surface 18H so as to seal as far as possible the curled portion to make a closed annular lip.

Preferably the shelf is reinforced by a flange 18C extending longitudinally of the shelf at a positon spaced rearwardly from the side edge and typically lying along a center line of the shelf. The flange preferably extends upwardly but can be depending. The flange 180 is formed by bringing together two flange portions 181, 182 of the components 18E and 18D and fastening then together to define a common structure strongly stiffened by the double flange arrangement.

Figure 2:
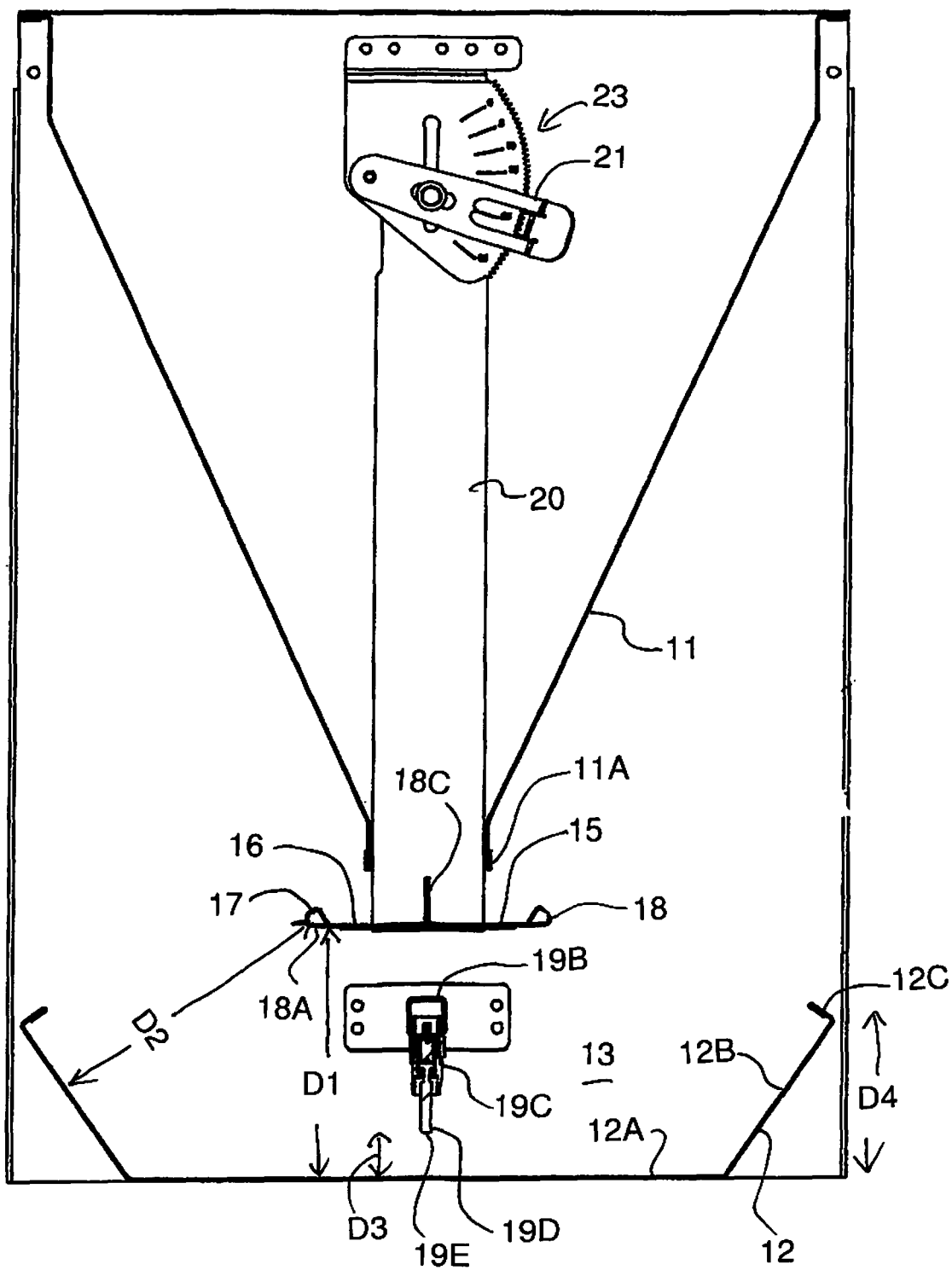
FIG. 2 is a cross sectional view through the feeder according to the present invention of FIG. 1 showing the design and arrangement of the shelf which allows the use of the feeder for pigs ranging from weanlings at roughly 20 pounds to finisher pigs which can weigh 200 to 300 pounds.

As shown in FIG. 2, the underneath of the shelf provides a totally flat surface with no downwardly projecting components. Thus the bottom of the shelf can be easily cleaned was it has no protuberances which can interfere with the flow of a cleaning fluid. The curled edges 18 can be curled as shown so that they are wholly above the horizontal surface or then can have slight downward component centered around an axis aligned with the horizontal portion (not shown). The curled cylindrical edges and the stiffening flange provide sufficient stiffness to prevent the shelf from sagging when supported only at the two ends.

The shelf has a distance D1 from the horizontal surface to the base of less than 8.0 inches and preferable less than 7.0 inches and in the example shown specifically 6.7 inches.

The shelf can also be stiffened along the length of the shelf by a stiffening member which can be v-shaped or a channel member with two legs along an underside of the shelf at a position spaced from the front edge 17. As the stiffening member is located at the center, it does not interfere with the access by the animal to the nipples since it is above the pipe 19B.

In order to allow the finisher pig to reach the nipple lever 19D the bottom end 19E of the nipple is located a distance D3 from the base of less than 2.0 inches and preferably less than 1.5 inches and typically of the order of 1.0 inch and specifically 1.2 inches.

The front edge of the shelf 17 has a closest distance D2 from a top edge 12C of the side wall which is less than 7.0 inches. The side wall 12 of the trough has a height D4 which is no greater than 5 inches in height.

As shown, the trough and the shelf are both a double sided such that the pigs can access both from each side with the shelf located midway across the trough. However single sided feeders with the same dimensions and characteristics can manufactured for example for mounting in feed lines.

The invention claimed is:

1. A method for feeding pigs as they grow continually from weanling size to finisher pig size comprising:
   providing a feeder unit which is accessed by the pigs both at weanling and finisher size;
   the feeder unit having an elongate trough having a base and a sidewall for receiving and containing feed and arranged such that the head of the pig can reach over a top edge of the sidewall to the base for eating the feed;
   the feeder unit having an elongate shelf extending substantially along a full length of the trough and providing a substantially horizontal surface for receiving feed, said horizontal surface of said shelf being arranged rearwardly of said top edge and separate from said trough such that any feed falling therefrom along the full length thereof can fall directly vertically downwardly into the trough and so as to allow access by the head of the pig to said shelf for direct feeding therefrom, and between said shelf and said top edge to said base;
   the feeder unit having a hopper for directly and continuously depositing feed onto said shelf;
   said hopper including an elongate lowermost edge,
   the feeder unit having said lowermost edge and said shelf mounted and arranged such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents the feed from falling over the front edge of the shelf and thus automatically controls deposit of further feed onto said shelf;
   the feeder unit having a water pipe located underneath the shelf along the shelf with a plurality of water dispensing nipples mounted on the pipe at spaced positions along the pipe and extending from the pipe downwardly toward the base of the trough, the nipples being operable by the pigs to dispense water downwardly into the trough for mixing with feed in the trough;
   the shelf being substantially fixed in height at a common height for use by the pigs both as weanling size and as they grow to finisher size;
   while the shelf is held at a substantially fixed height relative to the upper front edge of the side wall and relative to the nipples, causing weanlings to be fed at the feeder unit;
   and arranging the fixed height such that the weanlings reach the feed on the shelf;
   while the shelf is held at the same substantially fixed height relative to the upper front edge of the side wall and the nipples, causing finisher pigs to be fed at the feeder unit;
   and arranging the fixed height such that the finisher pigs reach over the top edge of the side wall under the front edge of the shelf and operate the nipples.

2. The method according to claim 1 wherein the shelf is adjustable in height over a distance sufficient only to adjust the space between the bottom edge of the hopper and the horizontal surface of the shelf to control supply of material onto the shelf.

3. The method according to claim 2 wherein the shelf is adjustable in height by a distance less than 1.0 inch.

4. The method according to claim 1 wherein a front edge of the shelf has no portion extending downwardly from the horizontal surface of the shelf to a distance greater than 1.5 inches.

5. The method according to claim 1 wherein the shelf has an edge portion defined by a curl or hem on the shelf edge wherein no part of the curled or hemmed edge portion extends downwardly to a distance greater than 1.5 inches from the horizontal surface.

6. The method according to claim 1 wherein the shelf is reinforced by a member extending longitudinally of the shelf at a position spaced rearwardly from the front edge such that the head of the finisher pig can pass underneath the front edge and underneath the member to the nipple adjacent the base.

7. The method according to claim 1 wherein the shelf has a distance from the horizontal surface to a flat horizontal portion of the base of less than 8.0 inches.

8. The method according to claim 1 wherein a bottom end of each nipple is located a distance from a flat horizontal portion of the base of less than 2.0 inches.

9. The method according to claim 1 wherein the front edge of the shelf has a closest distance from a top edge of the side wall which is less than 7.0 inches.

10. The method according to claim 1 wherein the trough and the shelf are both double sided such that the pigs can access both from each side with the shelf located midway across the trough.

11. The method according to claim 10 wherein the shelf is reinforced by a member extending longitudinally of the shelf at a position spaced rearwardly from the front edge such that the head of the finisher pig can pass underneath the front edge and underneath the member to the nipple adjacent the base and wherein the member is along a center line of the shelf.

12. The method according to claim 1 wherein the side wall of the trough is no greater than 5 inches in height.

13. The method according to claim 1 wherein the weanlings weighs less than 30 pounds and finisher pigs greater than 200 pounds.

14. A method for feeding pigs as they grow continually from weanling size to finisher pig size comprising:
   providing a feeder unit which is accessed by the pigs both at weanling and finisher size;
   the feeder unit having an elongate trough having a base and a sidewall for receiving and containing feed and arranged such that the head of the pig can reach over a top edge of the sidewall to the base for eating the feed;
   the feeder unit having an elongate shelf extending substantially along a full length of the trough and providing a substantially horizontal surface for receiving feed, said horizontal surface of said shelf being arranged rearwardly of said top edge and separate from said trough such that any feed falling therefrom along the full length thereof can fall directly vertically downwardly into the trough and so as to allow access by the head of the pig to said shelf for direct feeding therefrom, and between said shelf and said top edge to said base;
   the feeder unit having a hopper for directly and continuously depositing feed onto said shelf;
   said hopper including an elongate lowermost edge,
   the feeder unit having said lowermost edge and said shelf mounted and arranged such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents the feed from falling over the front edge of the shelf and thus automatically controls deposit of further feed onto said shelf;

the feeder unit having a water pipe located underneath the shelf along the shelf with a plurality of water dispensing nipples mounted on the pipe at spaced positions along the pipe and extending from the pipe downwardly to a bottom end of each nipple adjacent to the base of the trough, the nipples being operable by the pigs to dispense water downwardly into the trough for mixing with feed in the trough;

the shelf being substantially fixed in height at a common height for use by the pigs both as weanling size and as they grow to finisher size;

while the shelf is held at a substantially fixed height relative to the upper front edge of the side wall and relative to the nipples, causing the weanlings to be fed at the feeder unit;

and arranging the fixed height such that the weanlings reach the feed on the shelf;

while the shelf is held at the same substantially fixed height relative to the upper front edge of the side wall and the nipples, causing the finisher pigs to be fed at the feeder unit;

and arranging the fixed height such that the finisher pigs reach over the top edge of the side wall under the front edge of the shelf and operate the nipples;

wherein the shelf is formed of sheet material which has a side edge portion of the sheet material forming the shelf defined by a curled portion of the sheet material which is curved upwardly and inwardly such that the edge of the material sits on an upper surface of the material, the curled portion being located on top of the upper surface such that a bottom surface of the shelf at the edge is substantially flat with no depending portion.

15. The feeder unit according to claim 14 wherein the shelf is reinforced by a member extending longitudinally of the shelf at a position spaced rearwardly from the side edge.

16. The feeder unit according to claim 15 wherein the member is a flange lying along a center line of the shelf.

17. The feeder unit according to claim 16 wherein the flange extends upwardly.

18. A feeder unit for feeding pigs as they grow continually from weanling size to finisher pig size comprising:

an elongate trough having a base and a sidewall for receiving and containing feed and arranged such that the head of the pig can reach over a top edge of the sidewall to the base for eating the feed;

an elongate shelf extending substantially along a full length of the trough and providing a substantially horizontal surface for receiving feed, said horizontal surface of said shelf being arranged rearwardly of said top edge and separate from said trough such that any feed falling therefrom along the full length thereof can fall directly vertically downwardly into the trough and so as to allow access by the head of the pig to said shelf for direct feeding therefrom, and between said shelf and said top edge to said base;

a hopper for directly and continuously depositing feed onto said shelf;

said hopper including an elongate lowermost edge, the feeder unit having said lowermost edge and said shelf mounted and arranged such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents the feed from falling over the front edge of the shelf and thus automatically controls deposit of further feed onto said shelf;

the feeder unit having a water pipe located underneath the shelf along the shelf with a plurality of water dispensing nipples mounted on the pipe at spaced positions along the pipe and extending from the pipe downwardly toward the base of the trough, the nipples being operable by the pigs to dispense water downwardly into the trough for mixing with feed in the trough;

wherein the shelf is formed of sheet material which has a side edge portion of the sheet material forming the shelf defined by a curled portion of the sheet material which is curved upwardly and inwardly such that the edge of the material sits on an upper surface of the material, the curled portion being located on top of the upper surface such that a bottom surface of the shelf at the edge is substantially flat with no depending portion.

19. The feeder unit according to claim 18 wherein the shelf is double sided with two symmetrical side edge portions.

20. The feeder unit according to claim 18 wherein the shelf is reinforced by a member extending longitudinally of the shelf at a position spaced rearwardly from the side edge.

21. The feeder unit according to claim 20 wherein the member is a flange lying along a center line of the shelf.

22. The feeder unit according to claim 21 wherein the flange extends upwardly.

23. A method for feeding pigs as they grow continually from weanling size to finisher pig size comprising:

providing a feeder unit which is accessed by the pigs both at weanling and finisher size;

the feeder unit having an elongate trough having a base and a sidewall for receiving and containing feed and arranged such that the head of the pig can reach over a top edge of the sidewall to the base for eating the feed;

the feeder unit having an elongate shelf extending substantially along a full length of the trough and providing a substantially horizontal surface for receiving feed, said horizontal surface of said shelf being arranged rearwardly of said top edge and separate from said trough such that any feed falling therefrom along the full length thereof can fall directly vertically downwardly into the trough and so as to allow access by the head of the pig to said shelf for direct feeding therefrom, and between said shelf and said top edge to said base;

the feeder unit having a hopper for directly and continuously depositing feed onto said shelf;

said hopper including an elongate lowermost edge, the feeder unit having said lowermost edge and said shelf mounted and arranged such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents the feed from falling over the front edge of the shelf and thus automatically controls deposit of further feed onto said shelf;

the feeder unit having a water pipe located underneath the shelf along the shelf with a plurality of water dispensing nipples mounted on the pipe at spaced positions along the pipe and extending from the pipe downwardly to a bottom end of each nipple adjacent to the base of the trough, the nipples being operable by the pigs to dispense water downwardly into the trough for mixing with feed in the trough;

the shelf being substantially fixed in height at a common height for use by the pigs both as weanling size and as they grow to finisher size;

wherein the shelf has a distance from the horizontal surface to a flat horizontal portion of the base of less than 8.0 inches;

wherein the bottom end of each nipple is located a distance from a flat horizontal portion of the base of less than 2.0 inches;

wherein the front edge of the shelf has a closest distance from the top edge of the side wall of is less than 7.0 inches;

while the shelf is held at a substantially fixed height relative to the upper front edge of the side wall and relative to the nipples, causing the weanlings to be fed at the feeder unit;

and arranging the fixed height such that the weanlings reach the feed on the shelf;

while the shelf is held at the same substantially fixed height relative to the upper front edge of the side wall and the nipples, causing the finisher pigs to be fed at the feeder unit;

and arranging the fixed height such that the finisher pigs reach over the top edge of the side wall under the front edge of the shelf and operate the nipples.

24. The method according to claim 23 wherein the shelf is adjustable in height over a distance less than 1.0 inch which is sufficient only to adjust the space between the bottom edge of the hopper and the horizontal surface of the shelf to control supply of material onto the shelf.

25. The method according to claim 23 wherein the trough and the shelf are both a double sided such that the pigs can access both from each side with the shelf located midway across the trough.

26. The method according to claim 25 wherein the shelf is reinforced by a member extending longitudinally of the shelf at a position spaced rearwardly from the front edge such that the head of the finisher pig can pass underneath the front edge and underneath the member to the nipple adjacent the base and wherein the member is along a center line of the shelf.

27. The method according to claim 23 wherein the side wall of the trough is no greater than 5 inches in height.

28. The method according to claim 23 wherein the weanlings weighs less than 30 pounds and finisher pigs weigh greater than 200 pounds.

* * * * *